US009930880B2

(12) United States Patent
Johnson et al.

(10) Patent No.: US 9,930,880 B2
(45) Date of Patent: Apr. 3, 2018

(54) BAIT STATION WITH PACKAGE RETENTION

(71) Applicants: Daniel C. Johnson, Madison, WI (US); James R. Walsh, Wauwatosa, WI (US)

(72) Inventors: Daniel C. Johnson, Madison, WI (US); James R. Walsh, Wauwatosa, WI (US)

(73) Assignee: BELL LABORATORIES, INC., Madison, WI (US)

( * ) Notice: Subject to any disclaimer, the term of this patent is extended or adjusted under 35 U.S.C. 154(b) by 2 days.

(21) Appl. No.: 14/254,562

(22) Filed: Apr. 16, 2014

(65) Prior Publication Data

US 2015/0296767 A1    Oct. 22, 2015

(51) Int. Cl.
*A01M 25/00*    (2006.01)

(52) U.S. Cl.
CPC .................................. *A01M 25/004* (2013.01)

(58) Field of Classification Search
CPC .. A01M 1/2011; A01M 25/004; A01M 1/026; A01M 25/002; A01M 25/00; A01M 1/2005; A01M 23/16; A01M 23/005; A01M 23/02
USPC ..................... 43/131, 82, 83, 90, 81, 58, 124
See application file for complete search history.

(56) References Cited

U.S. PATENT DOCUMENTS

| 4,630,775 | A |   | 12/1986 | Mandon et al. |
| 5,167,740 | A | * | 12/1992 | Michaelis .......... B01D 46/0005 156/202 |
| 5,448,852 | A |   | 9/1995 | Spragins et al. |
| 6,082,042 | A |   | 7/2000 | Issitt |
| 6,415,544 | B1 | * | 7/2002 | Leyerle .................. A01M 23/24 43/82 |
| 6,493,988 | B1 | * | 12/2002 | Johnson .............. A01M 25/004 43/131 |
| 7,669,363 | B2 |   | 3/2010 | Frisch |

(Continued)

FOREIGN PATENT DOCUMENTS

WO    WO 9301712 A1  *  2/1993  ........... A01N 25/004

OTHER PUBLICATIONS

Webpage, Lodi Mouse Bait Station, <http://lodi-uk.com/Lodi%20Mouse%20Bait%20Station.html>, accessed Apr. 17, 2014.

(Continued)

*Primary Examiner* — Darren W Ark
*Assistant Examiner* — Jeffrey R Larsen
(74) *Attorney, Agent, or Firm* — Stiennon & Stiennon

(57) ABSTRACT

A rodent bait station for retention of sachet bait, which is a malleable bait retained within a porous bag or package having sidewardly protruding flaps. The bait station may be a molded plastic structure with a lid hinged to a base. Base walls define a bait compartment sized to receive the sachet bait such that the flaps overlie the opposed bait compartment base walls. The lid has downwardly protruding bait compartment walls which overlie the base bait compartment walls. Undulating or jagged teeth are formed on the lid and base bait compartment walls. When the lid is closed on the base, the teeth projecting from the lid cooperate with the teeth protruding from the base, thereby engaging and clamping a retained sachet bait package flaps to thus retain the package with the bait station even after a rodent has broken into the package to access the poison contained therein.

15 Claims, 4 Drawing Sheets

(56) References Cited

U.S. PATENT DOCUMENTS

| | | | |
|---|---|---|---|
| 8,387,304 B2 | 3/2013 | Cink et al. | |
| 8,769,865 B2* | 7/2014 | Cink | A01M 25/004 43/131 |
| 8,793,929 B1* | 8/2014 | Walsh | A01M 25/004 43/131 |
| 2004/0244274 A1 | 12/2004 | Dellevigne et al. | |
| 2009/0229170 A1* | 9/2009 | Gaibotti | A01M 25/004 43/131 |
| 2010/0325940 A1 | 12/2010 | Pryor et al. | |
| 2011/0247955 A1* | 10/2011 | Vickery | A01M 25/004 206/524.1 |

OTHER PUBLICATIONS

Webpage, Mouch'Clac Flytrap Bag, <www.an-protecta.eu/english/ficheimpression/sacmouchpoche_eng_pdf>, accessed Apr. 17, 2014.

Webpage, RACO Force Paste Pre-baited Mouse Station, <http://racopestcontrol.co.uk/prebaited_rodent_stations.html>, accessed Apr. 17, 2014.

Webpage, B.E.T.A.—Rat Bait Box, <http://www.wheatcroftpoultry.co.uk/productDetails.asp?intProductID=575&intCategoryID=25>, accessed Apr. 17, 2014.

* cited by examiner

BAIT STATION WITH PACKAGE RETENTION

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to rodent bait stations in general, and to bait stations configured to retain sachet baits in particular.

Rodents such as mice and rats are a significant hazard to human populations, and can spread disease and consume or spoil stored commodities. Palatable rodent baits laced with appropriate rodenticide can effectively control these pests. However, in order to restrict access to the poisonous rodenticide compounds, the baits are restrained within rodent bait stations—containers which allow the admission of the targeted rodent species, but which can provide physical obstacles to access to the contained bait by children or non-targeted animals such as pets or livestock.

Soft baits are various compounds which have a soft consistency, and may omit the usual paraffin composition which allows a bait to take on a definite structure. To restrain the bait within a bait station, the soft bait is contained within a paper package or bag which is easily tearable and which is permeable allowing the escape of aromas, permiting the targeted rodents to readily identify the palatable contents. Conventional soft bait has dynamic viscosity of $1 \times 10^8$ cP, i.e., a putty-like consistency. Dynamic viscosity in the SI derived unit is measured in grams/(cm·sec) or poise, more commonly expressed, particularly in ASTM standards, as centipoise (cP). Where peanut butter is about 250,000 cP and window putty is $1 \times 10^8$ cP, at room temperature i.e., 20° C.

Conventionally, the soft bait and its surrounding bag are held within a bait station by piercing the bait and bag with a spike or narrow-diameter rod which is fixed within the bait station. The bag keeps the contained bait supported on the rod until accessed by the rodent. Even should the bag contents lose its consistency due to the influence of the elevated temperatures which can be encountered in temperate climates, the bag retains the contents mounted to the rod. Another known station uses an array of multiple molded plastic pins extending from the bait station base and lid to engage the bag.

However, when rodents encounter the bait bag, they will gnaw through the paper packaging to access the bait within. If the torn paper bag is not well retained on the central spike or array of pins, it may readily be removed from the bait station either in pieces or as a whole. These scraps of paper can then be strewn around the vicinity of the station in an unsightly or unsanitary fashion. What is needed is an arrangement which takes advantage of the benefits of packaged soft bait while limiting the escape of paper components from a bait-containing station.

SUMMARY OF THE INVENTION

Sachet bait packages are retained within a rodent bait station of this invention by providing gripping teeth on mating lid and base walls of a bait compartment within the bait station. The bait station may be a molded plastic structure with a lid hinged to a base. The base walls define a bait compartment sized to receive the sachet bait such that the flaps overlie the opposed bait compartment base walls. The lid has downwardly protruding bait compartment walls which overlie the base bait compartment walls. Undulating or jagged teeth are formed on the lid and base bait compartment walls, which work together to retain the package. When the lid is closed on the base, the teeth projecting from the lid cooperate with the teeth protruding from the base, thereby engaging, gripping and clamping a retained sachet bait package flaps to thus retain the package within the bait station even after a rodent has broken into the package to access the bait contained therein. The lid and base teeth may interdigitate, or they may extend alongside one another to grip the material of the bait package.

It is an object of the present invention to retain a sachet bait package within a rodent bait station by gripping the paper of which the package is formed.

Further objects, features and advantages of the invention will be apparent from the following detailed description when taken in conjunction with the accompanying drawings.

DESCRIPTION OF THE PREFERRED EMBODIMENTS

Figure 1:
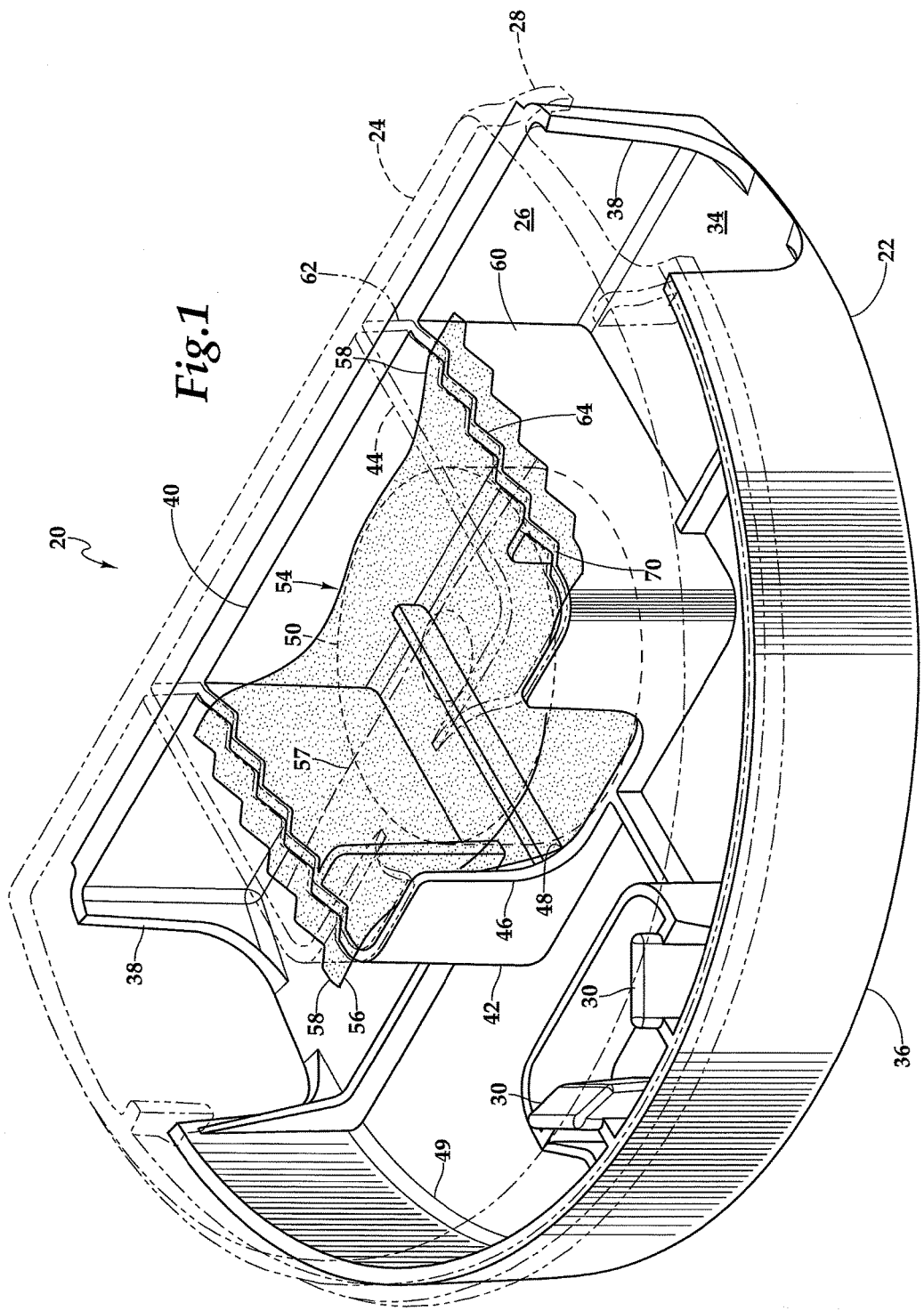
FIG. 1 is an isometric view of the bait station of this invention with the lid shown in phantom view.

Referring more particularly to FIGS. 1-6 wherein like numbers refer to similar parts, a rodent bait station 20 is shown in FIGS. 1-3 and 5. The bait station 20 may be injection molded of plastic, and has a base 22 with a lid 24 which is connected to a base rear wall 26 by a hinge 28. The lid 24 has a latch structure, not shown, which engages with two deflectable prongs 30 extending upwardly from the base 22. The prongs and the latch structure define a lock 32 which holds the lid 24 closed on the base.

The base 22 rear wall 26 extends upwardly from a bottom wall 34. A curved base front wall 36 also extends upwardly from the bottom wall. Two rodent access openings 38 are defined between the base rear wall 26 and the base front wall 36. A bait compartment 40 is defined within the base by upwardly extending base bait compartment walls 42 and downwardly extending lid bait compartment walls 44. The base bait compartment walls include a front wall 46 which has a rodent inlet 48 defined therein through which a rodent can gain access to the bait compartment 40. The rodent access openings 38 provide access to a rodent corridor 49 which is defined between the base front wall 36 and the bait compartment 40. The corridor 49 provides communication for the rodents between the rodent access openings 38 and the bait compartment rodent inlet 48. The bait compartment is dimensioned to accept a conventional sachet bait assembly 54, sometimes called a place pack. Alternatively, the compartment can receive a conventional rodent bait block.

The sachet bait assembly 54 contains a quantity of soft bait which is formed into an integral unit 50. The soft bait 50 may be of any composition which is palatable and attractive to rodents, and in most cases will contain a suitable rodenticide, although in some cases where tracking only is the objective, the bait may omit a rodenticide and contain other elements which allow the targeted rodents to be tracked as they follow their habitual paths within the infested area.

The sachet bait assembly 54 has a sealed exterior envelope or package 56 which is formed of an aroma-permeable sheet material, such as the porous paper from which teabags are commonly fabricated, for example, paper made of abacá fibers, i.e., a very thin and long fiber hemp, which may be augmented with a minor portion of synthetic fibers. The envelope sheet material is such as to allow rodents to detect the bait contained therein. The sheet material is an insignificant obstacle to the targeted rodent species rending it and accessing the interior bait 50. The package 56 may be formed of a single sheet folded over and sealed with an adhesive seal, at a transverse seam 57. The ends of the tube thus formed are then adhesive sealed and crimped to define opposed end seal regions or flaps 58, as shown in FIG. 1. The bait unit may be a ring about 1⅛ inches in diameter, and the package measured along the transverse seam may be about 3⅛ inches long, with each end flap 58 being about ½ inch wide. It is the end flap regions which are configured for gripping by the bait station and retention therein.

The base bait compartment front wall 46 is connected to two rearwardly extending side walls 60 which extend to the base rear wall 26. The bait compartment base side walls 60 are positioned parallel to one another and spaced apart to define the bait compartment. The lid 24 bait compartment walls 44 include a front wall 61 which connects two lid bait compartment side walls 62. The bait compartment lid side walls 62 are positioned parallel to one another and spaced apart to overlie the two bait compartment base walls 60.

Figure 2:
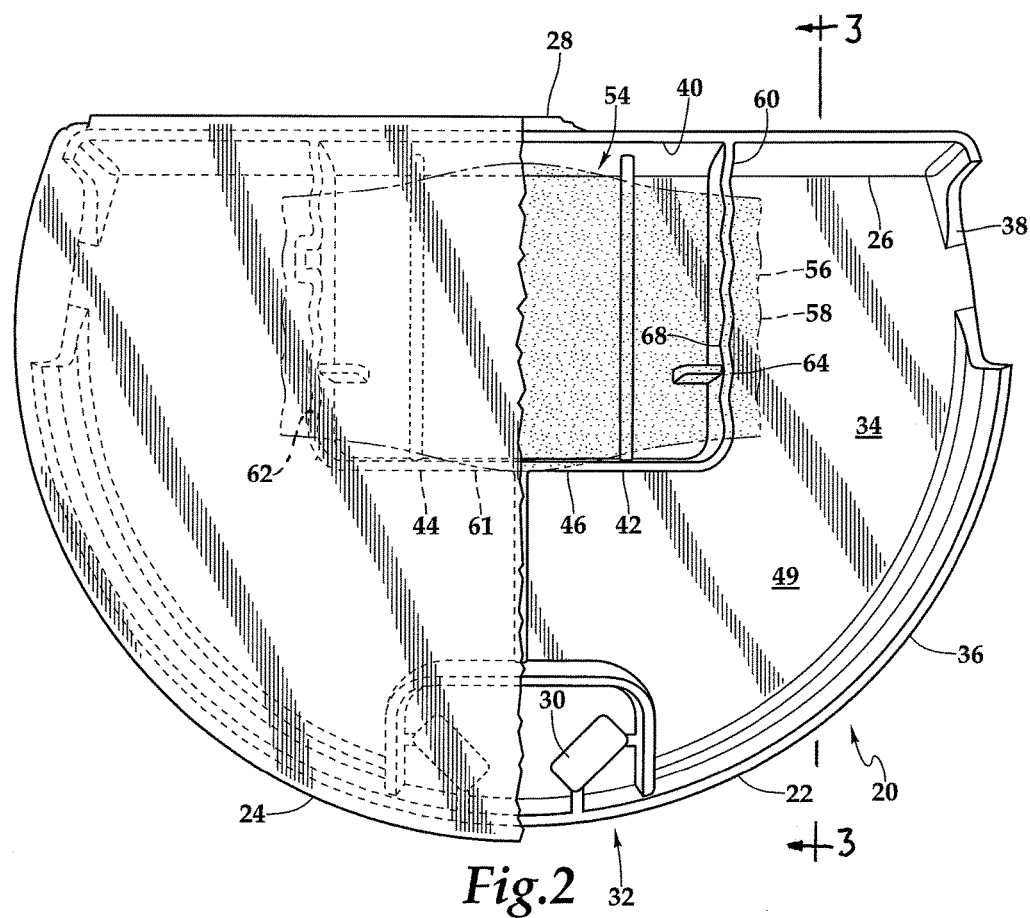
FIG. 2 is a top perspective view, partially broken away, of the bait station of FIG. 2.
Figure 3:
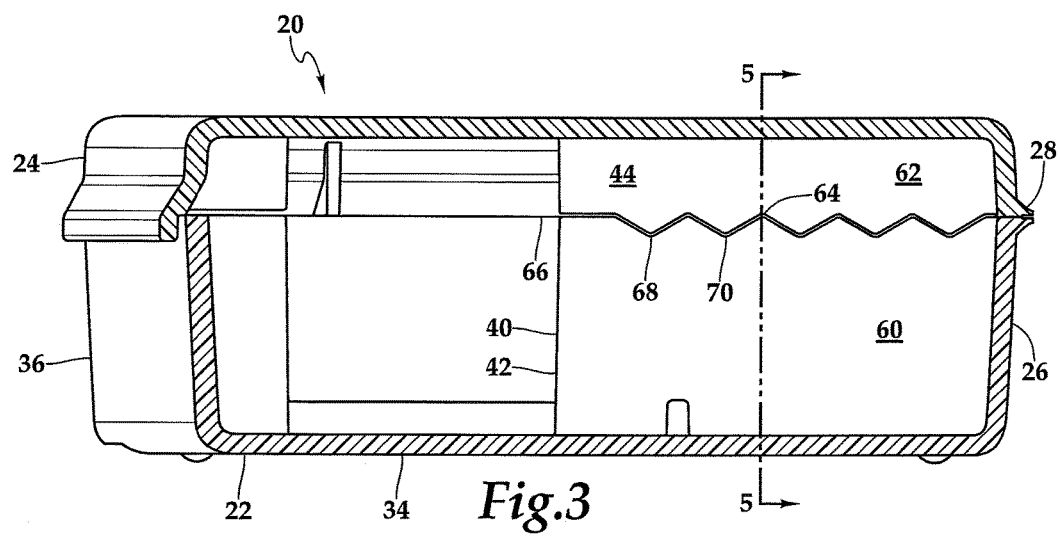
FIG. 3 is a side cross-sectional view of the bait station of FIG. 2, taken along section line 3-3.

As shown in FIG. 2, the sachet bait assembly 54 is disposed within the interior of the bait compartment such that the bait component 50 is retained within the bait compartment so the rodent bait is presented to only target species. As best shown in FIG. 3, each of the bait compartment side walls is terminated by a plurality of projections or teeth 64 which extend up to an upper perimeter 66. The teeth 64 may define a saw tooth arrangement where each tooth extends rearwardly about 3.7 times the height it extends above the trough 68 between teeth. The teeth 64 are formed integrally with the base bait compartment side walls. The lid bait compartment side walls 62 are also provided with a plurality of projections or teeth 70. The lid teeth 70 cooperate with the base teeth 64 to engage a sachet bait package which is disposed within the bait compartment. The sachet bait package 56 rests within the bait compartment with flaps 58 of the bait package extending outside of the bait compartment to extend over the base teeth 64. When the lid is closed on the base, the opposed flaps of the bait container are gripped between the lid teeth and the base teeth, to thereby clamp the two opposed flaps of the bait package within the bait compartment. In the arrangement of FIGS. 1-3 and 5 the lid teeth interdigitate with the base teeth, so each upper tooth is received within a trough defined between two base teeth.

Figure 5:
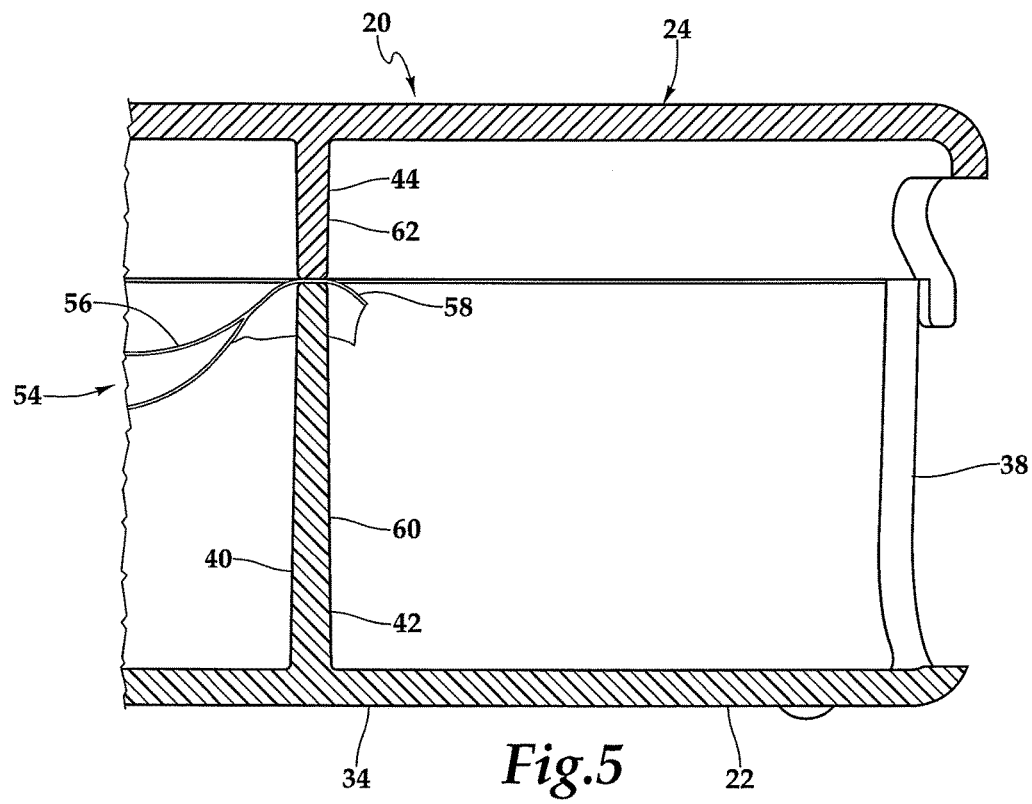
FIG. 5 is a fragmentary cross-sectional view of the bait station of FIG. 3, taken along section line 5-5.
Figure 6:
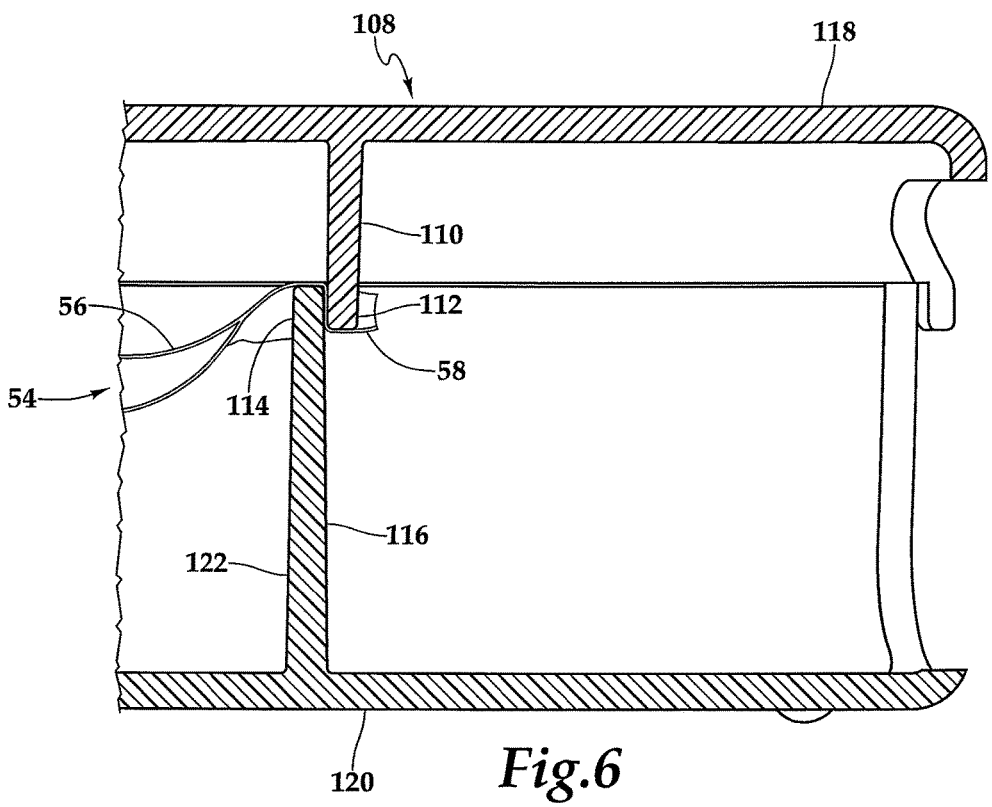
FIG. 6 is a fragmentary cross-sectional view of an alternative embodiment bait station of this invention in which the bait compartment base wall and lid wall are positioned to overlap in the closed configuration.

To achieve the desired result of holding the bait component 50 within the bait compartment 40 before it is consumed by the targeted rodent, and to retain as much of the paper package 56 as possible within the bait station 20 while the bait is being consumed, the edges/ends of the package must be fixed to the bait station and more particularly to the walls forming the bait compartment 40. This means it is desirable to grip the edges of the package as firmly as possible and still allow the sachet bait assembly/package 54, 56 to be installed and its remains to be removed when rebating the station 20. The clamping force made available by the opposed lid 24 and base 22 is limited or nonexistent in a typical bait station because of the flexibility of the materials used in constructing the bait station 20 e.g. plastic or sheet metal. If the opposed structures are lengthened so as to engage with more force when the lid is closed, it can become difficult to close the bait station. However, by utilizing the principle embodied in the so-called capstan or belt friction equation, aka Eytelwein's formula, ($T_{load}=T_{hold}e^{\mu\varphi}$ where $\varphi$ is the wrap angle and $\mu$ is the coefficient of friction) which relates the hold-force to the load-force if a flexible line is wound around a cylinder, it is possible to greatly increase the frictional engagement of the paper package 56 with the structures of the bait station 20. In particular, this is accomplished by interdigitating the teeth which causes an end flap 58 of the package 56 to wrap around the interdigitating teeth as shown in FIG. 5, or over the teeth when the teeth are offset, such that they do not directly engage, as shown in FIG. 6. The benefit of using this principle is that the paper package 56 is held securely at many points without creating high local stresses which would facilitate the paper package being torn. The final result is that the package is securely held before it is a chewed on by the rodent. The large peripheral edge of the paper package is held even as the integrity of the paper package is destroyed. This results in much of the paper package being retained within the bait station and the bait compartment even while the bait is consumed.

Figure 4:
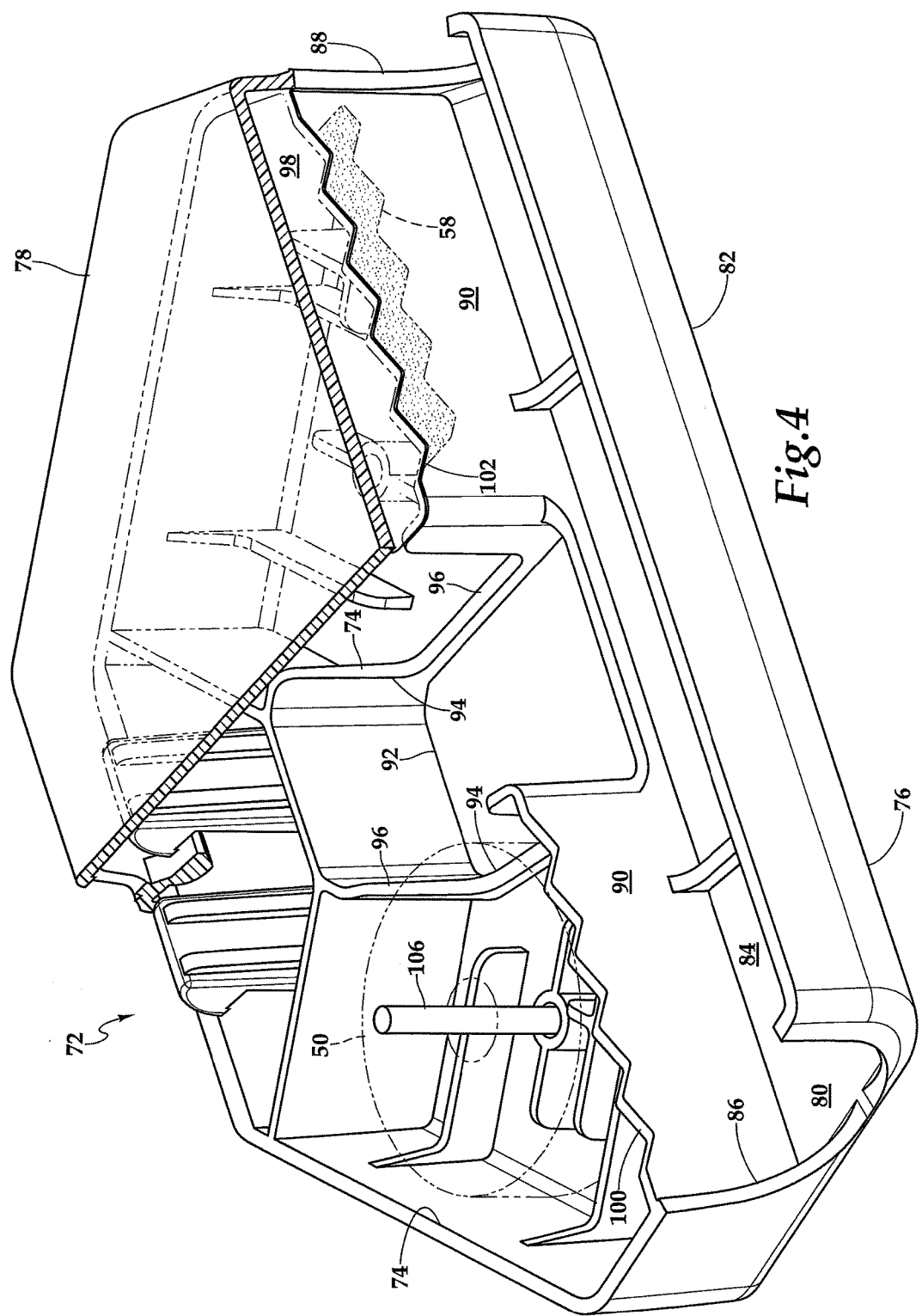
FIG. 4 is an isometric view, partially broken away in section of an alternative embodiment rodent bait station of this invention having two bait dispensing compartments.

As shown in FIG. 4, an alternative embodiment bait station 72 has two bait compartments 74. The bait station 72 has a molded plastic base 76 with a joined plastic lid 78. The base 76 has a bottom wall 80 with an upwardly extending rear wall 82 and a single rodent corridor 84 which extends from a first rodent access opening 86 to a second rodent access opening 88. Each of the two bait compartments 74 is defined by a base bait compartment side wall 90 which extends upwardly from the base bottom wall 80 and which extends parallel to the base rear wall 82. The two bait compartments 74 are accessible by the rodent from an antechamber 92 which opens off the rodent corridor 84. Each bait compartment 74 has a front wall 94 with a rodent inlet 96 which adjoins the antechamber 92. The lid 78 closes over the base, and has two downwardly extending bait chamber lid side walls 98 which overlie the base lid side walls 90. The base bait compartment side walls 90 have upwardly extending teeth 100 and the lid bait compartment side walls have downwardly extending teeth 102 which interdigitate with one another when the lid is closed on the base. Each bait compartment 74 can receive a sachet bait therein, or, alternatively, a conventional rodent bait block. For additional securement, the bait compartments may have an upwardly projecting pin or rod 106 which pierces the sachet bait assembly 54. The sachet bait assemblies 54 when received within the bait compartments 74 are positioned such that one of the package 56 flaps 58 protrudes out over the base teeth 100 on the side walls 90. When the lid is closed on the base, such as on a hinge (not shown), the interdigitating base and lid teeth 100, 102, grip the paper of the package 56 and retain the package to the bait station, even once the contents of the package have been consumed by rodents.

Another alternative embodiment bait station 108 is shown in FIG. 6. The bait station 108 has a lid 118 which fits on a base 120 to define an internal bait compartment 122 and is substantially identical to the bait station 20, with the exception that the bait compartment lid side walls 110 have downwardly projecting teeth 112 which do not interdigitate with the upwardly projecting teeth 114 of the base bait compartment side walls 116. Instead the lid bait compartment side walls 110 extend downwardly alongside the base bait compartment side walls 116. This arrangement can offer a greater wrap angle of the package material with the teeth of the walls, and hence even greater frictional engagement of the bait package 56.

It is understood that the invention is not limited to the particular construction and arrangement of parts herein illustrated and described, but embraces all such modified forms thereof as come within the scope of the following claims.

We claim:

1. A rodent bait station and sachet bait assembly, the assembly comprising:
    a sachet bait having a sealed exterior paper package which encloses an interior bait material, the exterior paper package being formed of an aroma-permeable sheet material, and the paper package having a protruding paper flap extending outwardly;
    a base having a bottom wall with an upwardly protruding exterior wall having portions defining at least one rodent access opening, and at least one bait compartment base wall which extends upwardly from the base bottom wall, wherein the at least one bait compartment base wall has portions which define a bait compartment for portions of the sachet bait package;
    a pin extending upwardly from the bottom wall within the bait compartment, wherein the pin extends through the sachet bait;
    a lid connected to the base by a hinge and moveable between a first position which permits direct access to the bait compartment, and a second position in which a top wall overlies the bait compartment, the lid having at least one bait compartment lid wall which is aligned with the at least one bait compartment base wall, the lid being closed on the base in the second position such that the at least one bait compartment lid wall overlies the at least one bait compartment base wall with the sachet bait flap extending therebetween;
    portions of the at least one bait compartment base wall which define a multiplicity of upwardly protruding teeth which extend to an uppermost first margin;
    portions of the at least one bait compartment lid wall which define a multiplicity of downwardly protruding teeth which extend downwardly below the level of the first margin, wherein in the second position, the downwardly protruding teeth cooperate with the upwardly protruding teeth to frictionally grip a portion of the bait package flap which is wrapped around the base upwardly protruding teeth; and
    wherein none of the downwardly protruding teeth or the upwardly protruding teeth penetrate the bait package flap.

2. The rodent bait station and sachet bait assembly of claim 1 wherein the downwardly protruding teeth interdigitate with the upwardly protruding teeth to frictionally grip the flap of the bait package retained within the bait compartment.

3. The rodent bait station and sachet bait assembly of claim 1 wherein the downwardly protruding teeth extend alongside the upwardly protruding teeth to frictionally grip the flap of the bait package retained within the bait compartment.

4. The rodent bait station and sachet bait assembly of claim 1 wherein the sachet bait package has two opposed paper flaps, and wherein the at least one bait compartment base wall comprises two bait compartment base walls positioned parallel to one another and spaced apart to define the bait compartment, and wherein the at least one bait compartment lid wall comprises two bait compartment lid walls which are positioned parallel to one another and spaced apart to overlie the two bait compartment base walls to frictionally grip the two opposed flaps of the bait package retained within the bait compartment with the lid in the second position.

5. The rodent bait station and sachet bait assembly of claim 4 wherein the two base bait compartment walls extend upwardly from the bottom wall at a location interior to the two bait compartment lid walls so that each base bait compartment wall overlaps one of the two bait compartment lid walls.

6. The rodent bait station and sachet bait assembly of claim 1 further comprising a second sachet bait package, and wherein the at least one bait compartment base wall comprises two bait compartment base walls, each defining a portion of a separate bait compartment, and wherein the at least one bait compartment lid wall comprises two bait compartment lid walls which are spaced apart to overlie the two bait compartment base walls to thereby each frictionally grip a flap of one of the bait packages retained within the two bait compartments when the lid is in the second position.

7. An assembly of a rodent bait station and a retained rodent sachet bait paper package, and the package enclosing a quantity of rodent bait and having a protruding paper flap, the assembly comprising:
    a base having a bottom wall from which a base bait compartment side wall extends, and wherein a rear wall extends upwardly from the base bottom wall to define a rodent corridor parallel to the bait compartment side wall;
    a lid hingedly connected to the base rear wall, and having a lid bait compartment side wall which extends towards the base bait compartment side wall;
    portions of the base bait compartment side wall which define a plurality of teeth which protrude upwardly to a first height; and
    portions of the lid bait compartment side wall which define a plurality of teeth which extend downwardly below the level of the first height, wherein the base teeth, and the lid teeth frictionally grip the paper package flap wrapped about the base side wall teeth to retain the rodent bait package in connection with the bait station; and
    wherein none of the base teeth or the lid teeth penetrate the bait paper package flap.

8. The assembly of claim 7 wherein the downwardly protruding plurality of teeth interdigitate with the upwardly protruding teeth to frictionally grip the paper package flap.

9. The assembly of claim 7 wherein the downwardly protruding teeth extend alongside the upwardly protruding teeth to frictionally grip the paper package flap.

10. The assembly of claim 7 wherein the base bait compartment side wall is positioned opposite a second base bait compartment side wall which is parallel to the base compartment side wall to define a bait compartment therebetween, and wherein the rodent bait is positioned within the bait compartment.

11. The assembly of claim 7 wherein the base bait compartment side wall is positioned aligned with a second base bait compartment side wall, each defining a portion of a separate bait compartment, the two bait compartments communicating with an antechamber which communicates with the rodent corridor, and bait compartment lid side walls are spaced apart to overlie the two bait compartment base side walls, and further comprising a second rodent bait package retained within the bait station.

12. A rodent bait station with at least one sachet bait having a sealed exterior paper package which encloses an interior bait material, and the paper package having a protruding paper flap extending outwardly, the bait station comprising:
- a base having a bottom wall with an upwardly extending rear wall, wherein a single rodent corridor extends along the rear wall between a first rodent access opening and a second rodent access opening, wherein two bait compartments are defined within the base, each bait compartment having a side wall which extends upwardly from the base bottom wall and which is spaced from the rear wall, and wherein portions of the base define an antechamber which communicates with the single rodent corridor and the two bait compartments;
- a lid hinged to the base and pivotable between a first position which permits direct access to the two bait compartments, and a second position in which a lid top wall overlies the two bait compartments, the lid having two downwardly extending bait compartment side walls which are aligned with the two bait compartment base side walls, the lid being closed on the base in the second position such that the lid bait compartment side walls overlie the two bait compartment side walls;
- portions of each of the two bait compartment side walls which define a multiplicity of upwardly protruding teeth which extend to an uppermost first margin;
- portions of the two bait compartment lid side walls which define a multiplicity of downwardly protruding teeth which extend downwardly below the level of the first margin, such that in the second position, the downwardly protruding teeth are positioned to cooperate with the upwardly protruding teeth to frictionally grip a portion of said bait package flap wrapped around the base upwardly protruding teeth, wherein at least one of the two bait compartments containing the at least one sachet bait; and
- wherein none of the downwardly protruding teeth or the upwardly protruding teeth penetrate the bait package flap.

13. The bait station of claim 12 wherein the downwardly protruding teeth interdigitate with the upwardly protruding teeth.

14. The bait station of claim 12 wherein the downwardly protruding teeth extend alongside the upwardly protruding teeth.

15. The bait station of claim 12 further comprising a rod which extends upwardly within each bait compartment positioned to pierce a sachet bait therein.

* * * * *